(12) United States Patent
Luettgens et al.

(10) Patent No.: US 7,699,199 B2
(45) Date of Patent: *Apr. 20, 2010

(54) METHOD AND DEVICE FOR PRODUCING GLASS PANES OF ANY DESIRED CONTOUR FROM SHEET GLASS

(75) Inventors: Thomas Luettgens, Mainz (DE); Winfred Hartmann, Rummelsheim (DE); Bernd Hoetzel, Worrstadt (DE); Patrick Markschlager, White Plains, NY (US); Andreas Neumayr, Mitterteich (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/236,060

(22) Filed: Sep. 23, 2008

(65) Prior Publication Data

US 2009/0065545 A1 Mar. 12, 2009

Related U.S. Application Data

(62) Division of application No. 11/459,774, filed on Jul. 25, 2006, now Pat. No. 7,441,680, which is a division of application No. 10/312,017, filed as application No. PCT/EP01/06801 on Jun. 15, 2001, now Pat. No. 7,104,431.

(30) Foreign Application Priority Data

Jun. 21, 2000 (DE) ................. 100 30 388

(51) Int. Cl.
C03B 33/04 (2006.01)
C03B 33/033 (2006.01)

(52) U.S. Cl. ......................... 225/2; 225/96.5

(58) Field of Classification Search ................. 225/2, 225/94, 96, 96.5, 103; 83/880; 65/17.1, 65/112, 174
See application file for complete search history.

(56) References Cited

U.S. PATENT DOCUMENTS

| 1,920,641 | A | | 8/1933 | Heichert |
| 2,372,215 | A | | 3/1945 | McCormick, Jr. |
| 2,504,655 | A | | 4/1950 | Dallas |
| 3,178,085 | A | | 4/1965 | Jochim |
| 3,559,855 | A | | 2/1971 | Barnett |
| 3,991,296 | A | | 11/1976 | Kojima et al. |
| 4,948,025 | A | | 8/1990 | Lisec |
| 5,016,800 | A | | 5/1991 | Sato et al. |
| 5,040,342 | A | * | 8/1991 | McGuire et al. ............... 65/112 |

(Continued)

FOREIGN PATENT DOCUMENTS

DE 430510 6/1926

(Continued)

*Primary Examiner*—Stephen Choi
(74) *Attorney, Agent, or Firm*—Baker & Daniels LLP

(57) ABSTRACT

A method for producing glass plates of any desired contour from sheet glass, comprising the following steps: scribing scribe lines into a least one face of the sheet glass along the contour down to a depth, using a cutting device, and positioning the glass plate on a support. The method is further characterized in that a defined force F is applied to the sheet glass so that it breaks along the scribe lines, said break extending through the entire thickness of the sheet glass. The flat glass may be sandwiched between two flexible plates prior to being placed on a base pad and being subjected to the breaking force.

3 Claims, 5 Drawing Sheets

U.S. PATENT DOCUMENTS

| | | | |
|---|---|---|---|
| 5,120,926 A | 6/1992 | Marriott | |
| 5,165,585 A | 11/1992 | Lisec | |
| 5,221,034 A * | 6/1993 | Bando | 225/96.5 |
| 5,301,867 A | 4/1994 | Bando | |
| 5,396,736 A * | 3/1995 | Bando | 451/70 |
| 5,458,269 A | 10/1995 | Loomis | |
| 5,551,618 A | 9/1996 | Shinozaki et al. | |
| 5,609,284 A | 3/1997 | Kondratenko | |
| 5,725,625 A | 3/1998 | Kitayama et al. | |
| 5,961,852 A | 10/1999 | Rafla-Yuan et al. | |
| 5,984,159 A * | 11/1999 | Ostendarp et al. | 225/93.5 |
| 6,255,621 B1 | 7/2001 | Lundquist et al. | |
| 6,412,677 B1 | 7/2002 | Yoshikuni et al. | |
| 6,795,274 B1 * | 9/2004 | Hsieh et al. | 360/135 |

FOREIGN PATENT DOCUMENTS

| | | |
|---|---|---|
| EP | 0 491 055 | 6/1992 |
| EP | 0 600 094 | 6/1994 |
| EP | 693 04 194 | 1/1997 |
| EP | 0 872 303 | 10/1998 |
| FR | 2 620 440 | 3/1989 |
| GB | 1 433 563 | 4/1976 |

* cited by examiner

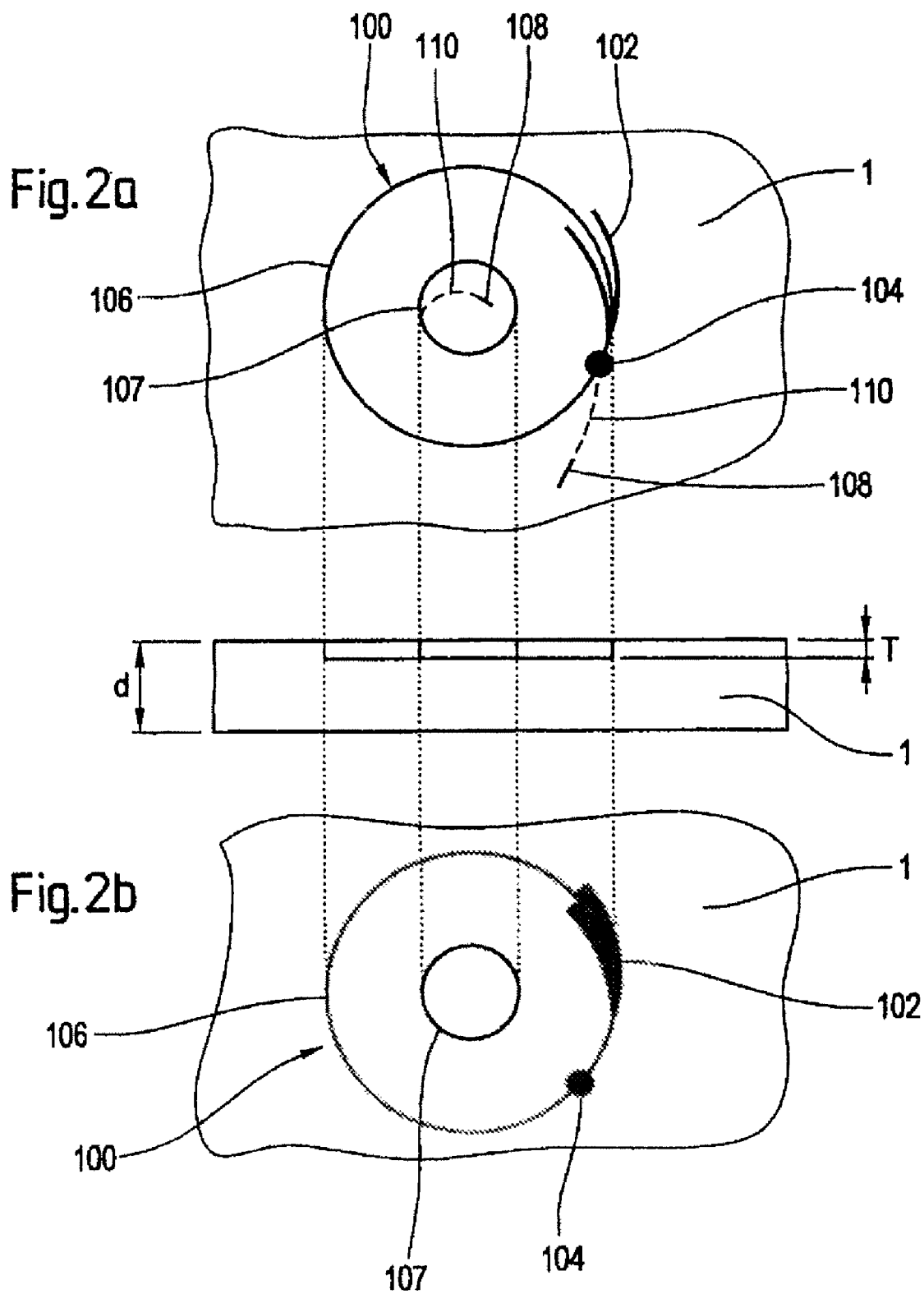

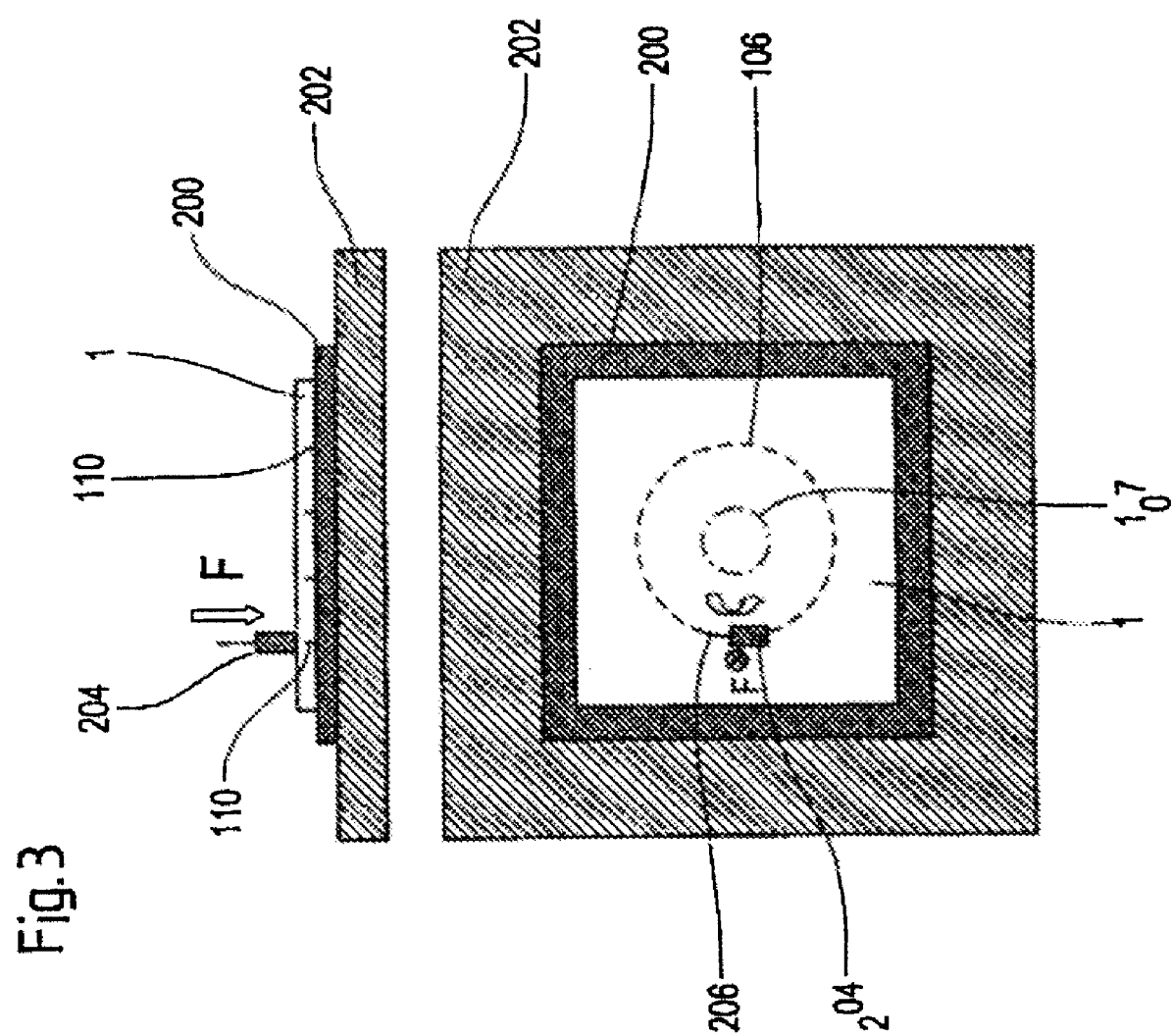

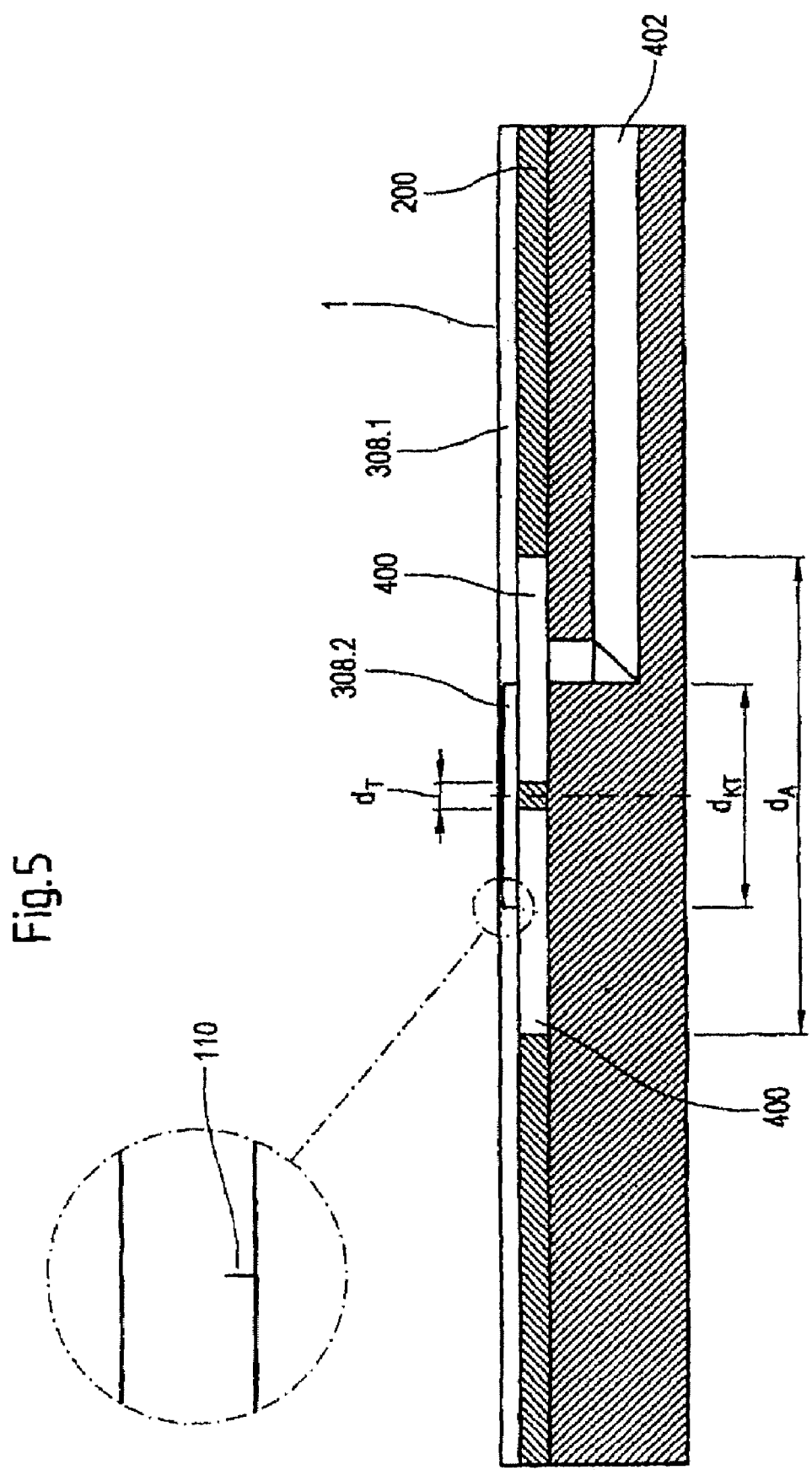

METHOD AND DEVICE FOR PRODUCING GLASS PANES OF ANY DESIRED CONTOUR FROM SHEET GLASS

CROSS-REFERENCE TO RELATED APPLICATION

This application is a division of pending U.S. patent application Ser. No. 11/459,774, filed Jul. 25, 2006, entitled METHOD AND DEVICE FOR PRODUCING GLASS PANES OF ANY DESIRED CONTOUR FROM SHEET GLASS, which is a division of U.S. patent application Ser. No. 10/312,017, now U.S. Pat. No. 7,104,431, entitled METHOD AND DEVICE FOR PRODUCING GLASS PANES OF ANY DESIRED CONTOUR FROM SHEET GLASS, granted Sep. 12, 2006, which application is related to and claims the benefit under 35 U.S.C. §119 and 35 U.S.C. §365 of International Application No. PCT/EP2001/06801, filed Jun. 15, 2001.

BACKGROUND OF THE INVENTION

The invention relates to a method for manufacturing glass plates of any contour from flat glasses, a separation line being driven, in a first stage, along a contour up to a predetermined depth in at least one side of a glass plate by means of a cutting device. Then, the glass plate is positioned and severed from the flat glass along the contour. The method is more specifically intended for manufacture of glass substrates for electronic storage media.

In addition to the method, the invention also provides a device for breaking glass plates of any contour out of flat glass. The device as well is more specifically directed to be used for manufacturing glass substrates for electronic storage media with an outside diameter and an inside diameter from a glass plate, such a device being comprised of a base pad and of a pressing facility.

Glass substrates for magnetic storage media, more specifically hard disks, are currently mainly made use of in laptop applications. The advantage of glass substrates over the currently widely used aluminum substrates lies in the increased rigidity, hardness, E-module and, as a result thereof, in the better resistance from impacts and the reduced fluttering.

Heretobefore, the applicability of glass substrates for magnetic storage media, more specifically hard disks, was made difficult because glasses with suited surface properties could only be provided with very high expense of technique.

This more specifically applies to the manufacturing of glass substrates by pressing and floating but also to glass ribbons manufactured by way of a drawing method as disclosed for example in U.S. Pat. No. 5,725,625.

With the drawn glass ribbons according to U.S. Pat. No. 5,725,625, the surface of the drawn glass must be subjected to two lapping steps and to two additional polishing steps.

A novel method as it is explained in the application Ser. No. 09/477,712, filed in the U.S. Patent Office on Jan. 5, 2000, the disclosure of which is fully incorporated herein, permits to achieve a drawn glass substrate that has a flatness $\leqq 25$ μm, more specifically $\leqq 10$ μm, a waviness <100 Å, more specifically <40 Å, a thickness variation of ±20 μm, more specifically ±15 μm, and a surface roughness <10 Angström, more specifically <5 Å.

The surface properties, flatness, waviness and surface roughness are determined according to the known method like for example standard measurement methods for display substrates as described in SEMI D15-1296 of SEMI (1996). The term flatness is to be construed as the departure from an ideal flat surface measured over the entire surface, the term waviness as the mean wavelength part of the departure from an ideal surface related to a medium sized reference distance and the term surface roughness as the departure in the short wavelength range related to a short distance of measurement for evaluation. Such good surfaces need no longer be finished as this is for example the case with the surfaces according to U.S. Pat. No. 5,725,625. For glass substrates, it is therefore desirable to indicate methods for manufacturing electronic storage media with which the surface finishing process may be dispensed with altogether or be considerably reduced.

Current state of the art methods are not suited for further processing the drawn or floated glass ribbons with a flatness $\leqq 25$ μm, a waviness <100 Å, a thickness variation of ±20 μm, and a surface roughness <10 Å that must be cut so as to obtain smooth edges, with any predetermined contour of the cuts being possible and the surfaces being largely prevented from being damaged during processing.

One approach to avoid both slivers, recesses and microcracks is to separate glass on the basis of thermally generated mechanical stresses. The beam of a heat source directed onto the glass is thereby moved relative to the glass at a constant speed, a high thermomechanical stress which causes the glass to crack being generated in the process. This thermomechanical stress is further increased by a cooling spot that follows the heat beam. Infrared radiators, special gas burners and more specifically lasers meet the property requirement placed on the heat source which consists in being capable of locally positioning the thermal energy, i.e., of positioning it with an accuracy better than one millimeter, more preferably better than 100 micrometers, which corresponds to the typical cutting accuracies. Lasers have proved efficient and have gained acceptance because of their good focusability, the good controllability of performance and the possibility to form the beam and to thus distribute the intensity on glass. The glass is pre-scribed by the laser beam prior to being mechanically broken. This method is known as the scribe and break process.

Methods of laser cutting that induce a thermomechanical stress reaching beyond the resistance to breaking of the material by locally heating it through the focussed laser beam in connection with a cooling step from the outside have been proposed in EP 0 872 303 A2, DE 693 04 194 T2 and DE 43 05 107 C2 as well as in U.S. Pat. No. 5,120,926.

GB-A-1433563 shows a method in which a separation line is driven in a glass substrate using a laser, the glass being then broken along said separation line by means of a cutting device which is harder than glass. Examples of such type cutting devices are diamond or aluminum cutting devices.

An alternative scribe and break process is disclosed by U.S. Pat. No. 2,372,215. According to this method, a separation line of a depth T is scribed in a glass surface using a cutting tool, such as a small diamond wheel for example, and the glass is then broken by mechanical action along said separation line for example.

In a preferred embodiment, the glass is broken along the separation line T by introducing on purpose temperature stresses in the glass.

With the prior art scribe and break techniques, glass substrates, more specifically for electronic storage media, cannot be manufactured so as to meet the required quality more specifically because of their thickness.

SUMMARY OF THE INVENTION

It is the object of the invention to indicate a method for manufacturing glass plates of any contour from flat glass, more specifically glass substrates for storage media, that involves as few steps as possible and that enables the manufacturing of individual glass substrates for electronic storage media largely without damaging the surfaces obtained during the glass drawing process. These methods are more specifically intended not to substantially degrade the surface properties obtained during the glass drawing or floating process which are: a flatness ≦25 μm, a waviness <100 Å, a thickness variation of ±20 μm, and a surface roughness <10 Å.

In accordance with the invention, the solution to this object is that, after having positioned the glass plate and scribing a contour, a defined force is applied onto the glass plate using a pressing facility so that the glass plate breaks along the separation line and said break is driven through the entire substrate. In an advantageous embodiment of the invention, there is provided that the glass plate is turned upside down prior to being broken on the base pad so that the side into which the separation or scribe line has been scribed is now lying on the base pad.

In a first embodiment of the invention, the base pad used has a large surface with a defined hardness. If the base pad is rotatable, the center of the inner or outer circle defined by the for instance annular separation line may be brought to coincide with the rotation center of the base pad or of the work table while the base pad is placed onto the glass plate. A pressure is exerted with a defined force onto the glass substrate, using a pressing tool such as a small wheel or a ball. The thus obtained break is driven completely through the glass plate by rotating the table.

In an alternative embodiment, the glass is disposed between two flexible plates. The thus obtained stack is placed onto a ring base for example, the diameter of which is greater than the diameter defined by the one contour of the separation line. Then, pressure is exerted from the opposite side using a punch, the diameter of the punch being smaller than that of the aperture. The force exerted by the punch causes the flexible plates and the glass to bend. Tensile stresses develop in the scribed line and the scribed line is driven through the material so that an external region of a flat glass can be completely severed from an internal region thereof.

The advantage of this method more specifically is that the flexible material reliably prevents the border from breaking off under transverse stresses, thus preventing the surface of the glass substrate from breaking off and forming recesses.

In a third method in accordance with the invention, the flat glass out of which the glass plate is to be broken is placed onto a board provided with a pocket. A vacuum is preferably applied to the pocket so that an annular surface load is created on the plate. Tensile stresses then develop in the scribed line and cause said scribed line to be driven through the material so that an external region can be completely severed from an internal region. Due to the for example annular shape of the pocket, the tensile stresses are greatest at the scribed line. Instead of applying a vacuum on the underside of the glass, compressed air or fluid pressure may also be utilized on the opposite side.

All of the methods according to the invention are suited for breaking or cutting both an internal hole out of the glass plate and the very glass plate from the flat glass. The terms breaking and cutting are to be construed herein in such a way that the separation line is completely driven through the glass substrate without the internal region and the external region having to be physically separated from one another.

In an additional stage of the process, the internal region may be separated, or the external region isolated, along the separation lines driven through the flat glass by the step of breaking or cutting. For this purpose, temperature differences are built between internal and external region and/or between external region and the surrounding flat glass. For this purpose, the internal region may be cooled selectively with liquid nitrogen for example. To isolate the external region, the surrounding flat glass may for example be heated by hot air with a temperature of 200° C.

BRIEF DESCRIPTION OF THE DRAWINGS

The invention will be described in closer detail herein after with reference to the drawing in which FIGS. 2A and 2B show how a separation line is driven to a depth T in a flat glass using a laser device FIG. 3 shows the breaking of a glass plate on a base pad with a predetermined hardness FIG. 5 shows the breaking of a glass plate using vacuum.

DETAILED DESCRIPTION

Figure 1A:
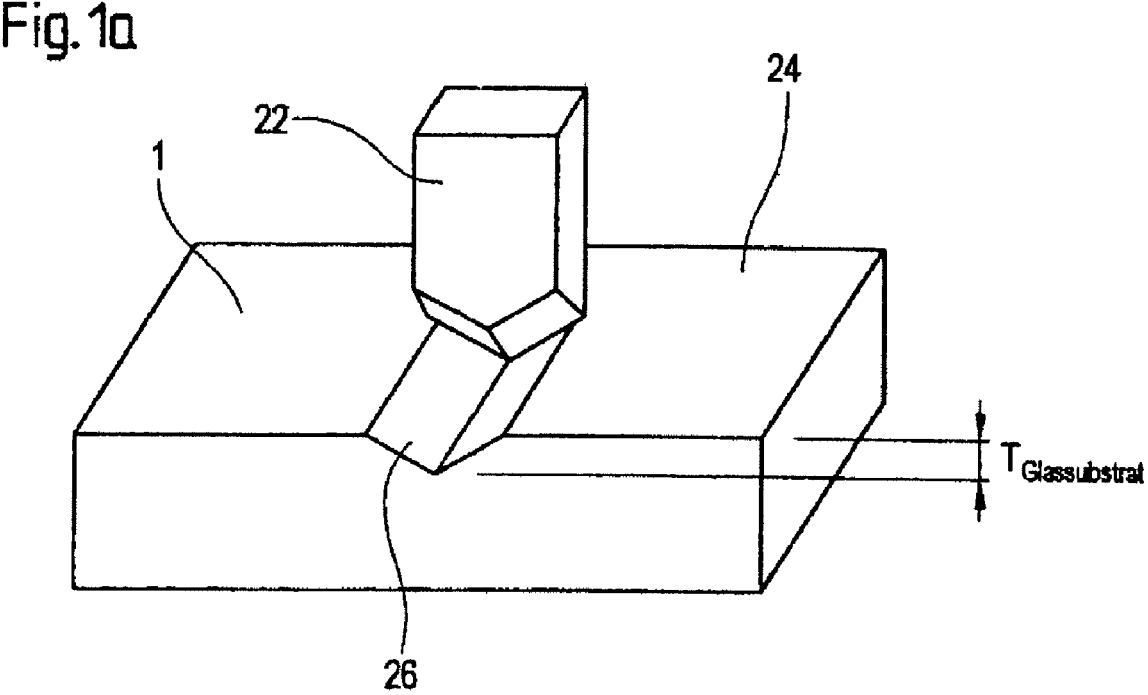
FIG. 1A is a view of a separation line scribed in a flat glass substrate using a mechanical cutting device
Figure 1B:
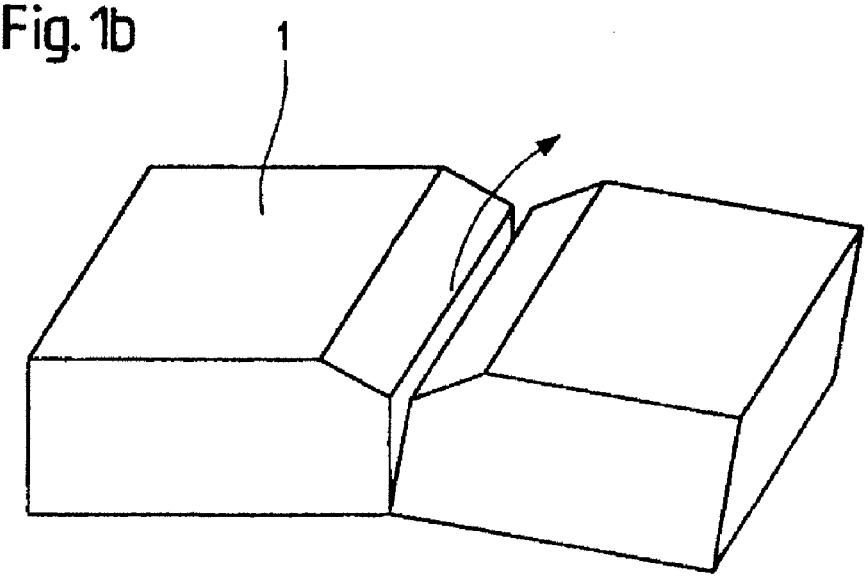
FIG. 1B shows how the flat glass is broken along the separation line

In the FIGS. 1A and 1B, a flat glass 1 is severed by scribing and breaking which is known as the scribe and break process. In a scribe and break process, the flat glass 1 is scribed up to a predetermined depth $T_{glass\ substrate}$ along a separation line 26 using a cutting device that is placed onto the surface of the glass 24.

After the glass is scribed along a separation line using the cutting tool 22, it is broken along the separation line as illustrated in FIG. 2B. The cutting tool 22 may for example be a mechanical cutting device such as a small cutting wheel.

It is particularly advantageous when the surface 24 of the glass plate is scribed along the separation line using a laser device. A particularly preferred method of laser cutting is described in the FIGS. 2A through 2B.

When scribing and breaking is performed using a laser cutting device, the surface of the glass is but slightly damaged. Therefore, a protective coating may be completely dispensed with.

FIG. 2A shows the fundamental principle of scribing for cutting a ring-shaped glass substrate for electronic storage media, in the present case a hard disk 100, out of a flat glass 1 by means of a laser beam. The flat glass serving as a starting product typically has a thickness d ranging from 0.3 to 5 mm.

In the example according to FIG. 2A, the laser beam profile is configured to form a V-shaped focal spot 102 on the flat glass 1, said spot being curved according to the circular contour to be severed. It is followed by a cooling spot 104 that increases the thermomechanical stress generated by the laser beam beyond the resistance to breaking of the glass. Said cooling spot may for example be realized by blowing a cooling gas, preferably cold air or a water-air mixture, thereon. The V-shaped focal spot may preferably be realized as described in EP 0 873 303 A2 for example.

Other focal spot geometries may be used instead of the V- or U-shaped focal spot 102 illustrated herein.

The flat glass 1 is severed in two stages.

In the first stage according to FIG. 2A, the parameters with regard to laser performance, laser beam profile, focus deposition, chart speed, meaning the speed of the relative motion between focal spot 102, flat glass 1 and cooling 104 are defined in such a manner that a thermomechanical stress is built in the glass which scribes said glass to a predetermined depth T. Typically, the depth T of the scribed line ranges from 0.08 to 0.3 mm.

Both the external contour 106 for the glass substrate and the internal contour 107 for the inner hole of the glass substrate may be scribed with the thus defined parameters, a mechanically scribed line 108 serving in both cases as a pre-scribed line being formed by means of the known methods, a cutting wheel for example. A particular advantage is obtained when the pre-scribed line 108 is continued by a laser scribed line 110 so that it tangentially runs into the circular curve of the external and internal contour. This superficial scribing assists in achieving a separation without offset of the closed contours 106 and 107.

According to the invention, the glass is broken along the separation line as described hereinafter.

FIG. 3 shows a first possibility that permits to drive scribed lines formed in the way described herein above by means of a laser for example and constituting the inside and the outside diameter of a hard disk 100 deep through the thickness thereof. There is provided, in accordance with the invention, that, after the separation lines for the inside and the outside diameter are laser scribed, the flat glass 1 to be processed is turned upside down and positioned onto a base pad 200 of a defined hardness. It is particularly advantageous when the base pad 200 is placed on a rotatable work table 202. When using a rotatable work table, it is advantageous to dispose the glass plate from which the circular glass substrate, the future hard disk for example, is cut out in such a manner that it enables as exact a superposition of the center of the hard disk and of the rotation center of the work table 202 as possible. A pressure is exerted onto the glass substrate 1 by means of a pressing facility in the form of a small wheel 204 or of a ball for example, a defined force F being applied over the separation line for the outside diameter or over the separation line for the inside diameter. The break line 206 obtained is driven further by rotating the work table 202. The distance from the wheel or the ball may vary depending on the position of the break 206 in the glass substrate. This influence is compensated for by an adjustable force.

The hardness of the base pad 200 correlates to the breaking force to be applied. Generally speaking, the following applies: the lower the hardness of the base pad 200, the lower the breaking force needed. The process is more difficult to control with soft bases, though.

Furthermore, it has been found out that the positioning accuracy of the wheel 204 on the scribed line 110 influences the angularity of the work piece's edge. With wide wheels, the positioning is non-critical. However, wide wheels are but conditionally usable for the small inside diameters on account of the high deflection. For breaking the inside diameter, the use of a ball is therefore advisable.

Figure 4:
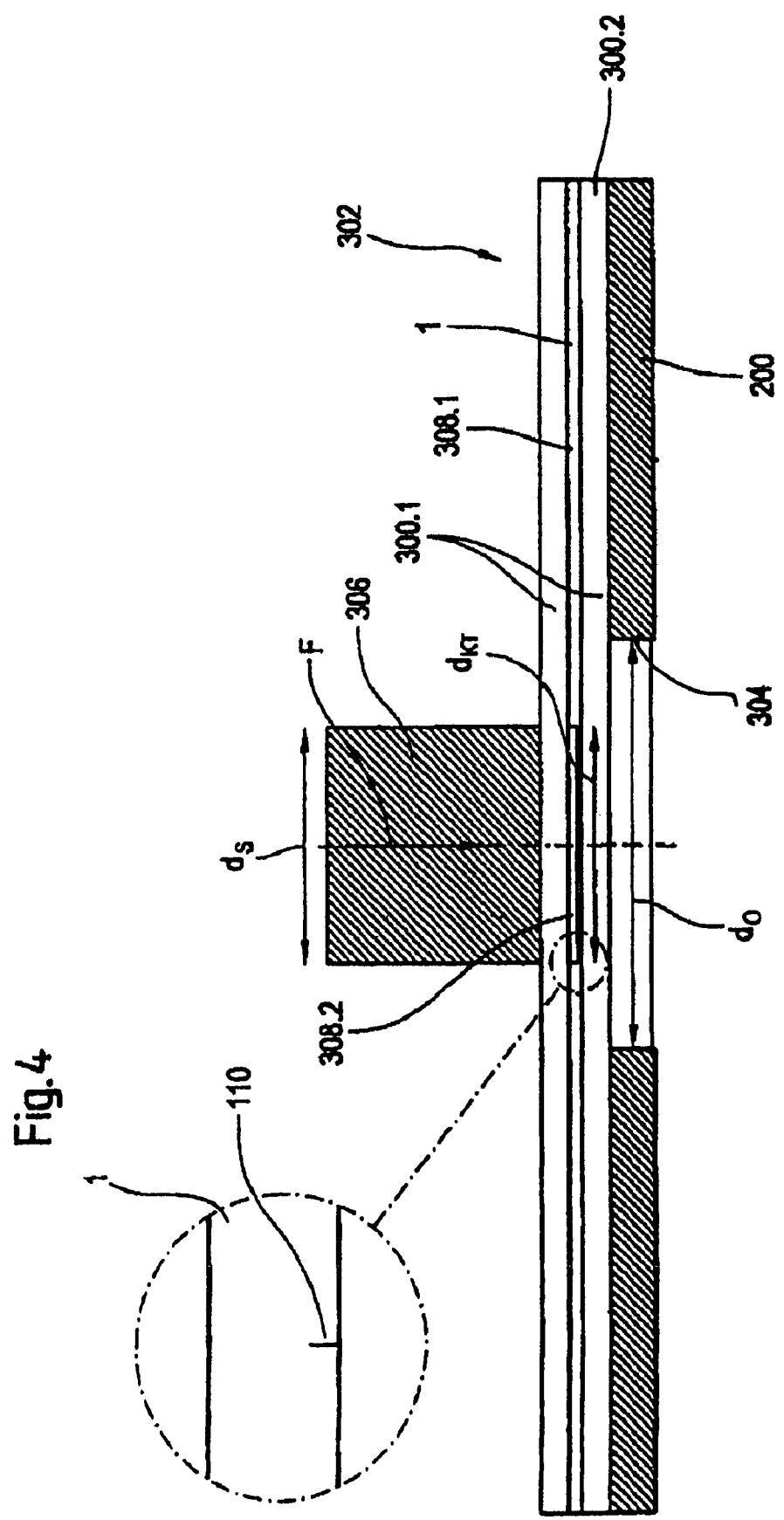
FIG. 4 shows the breaking of a glass plate with a punch in combination with a ring

FIG. 4 discloses a method for breaking glass plates out of flat glass 1 that represents an alternative to that illustrated in FIG. 3. The flat glass 1, from which a glass plate of any contour is to be severed, is placed between two flexible plates 300.1 and 300.2 made of plexiglass. The flat glass 1 is sandwiched between plates 300.1 and 300.2 thus forming a kind of stack 302. The stack consisting of the flat glass 1 and the flexible plates 300.1 and 300.2 rests on a base pad 200 with an aperture 304. The diameter $d_o$ of the aperture is always greater than the diameter of the separation line $d_{KT}$ which is shaped like an arc of a circle.

To cut the glass plate out of the flat glass along the separation line, a pressure is exerted, from the side opposite the aperture 304, with a force F by means of a punch 306 for example. The punch 306 has a diameter $d_s$ that is smaller than the diameter of aperture $d_o$. The force F causes the flexible plates 300.1 and 300.2 and the flat glass 1 to bend. A tensile stress is thus generated in the scribed or separation line 110. The force F drives the scribed line through material 1 so that the external region of flat glass 308.1 is completely severed from the internal region 308.2 which corresponds for example to the contour of the glass plate to be cut out and, as a result thereof, to the outside diameter. With the method according to the second embodiment of the invention it is particularly advantageous that the flexible material 300.1, 300.2 surrounding the flat glass 1 prevents it from breaking off at the border as a result of transverse stresses. Further, the surface of the flat glass is protected.

FIG. 5 shows a third method according to the invention. The flat glass 1 lies on a base pad 200 with an annular pocket 400. The annular pocket has an inside diameter $d_i$ that is smaller than the diameter $d_{KT}$ of the circular separation line which corresponds either to the inside or to the outside diameter of the glass plate that is to be cut out of the flat glass. The outside diameter of the pocket $d_A$ is greater than the diameter of the separation line $d_{KT}$ that is shaped like an arc of a circle. If a vacuum is applied to the pocket via connections 402, an annular surface load is exerted on flat glass 1. The annular surface load creates a tensile stress in the scribed or separation line 110. As a result thereof, the scribed line is driven through the material so that an external region 308.1 is completely separated from an internal region 308.2 like in the embodiment according to FIG. 4.

All of the methods described herein above are suited both for cutting or breaking the entire glass plate out of flat glass 1 and for cutting or breaking the internal hole when the glass plate is used to form a hard disk for example.

The annular pocket 400 causes the tensile stresses to be greatest at the scribed line. However, the method is also possible using a hole-shaped pocket, i.e., a pocket without a central part of a diameter $D_i$. Then, it must only be ensured that the diameter $D_A$ of such a hole-shaped pocket is greater than the diameter of the separation line $D_{KT}$ that is shaped like an arc of a circle.

In an alternative embodiment, compressed air may be applied on the side opposite the pocket instead of applying, via a vacuum connection 402, a vacuum on the underside of flat glass 1.

A concrete exemplary embodiment of the invention will be given herein after:

A hard disk plate with an outside diameter of 65 mm and an inside diameter of 20 mm is cut out of a flat glass plate having the dimensions: 80×80×0.7 mm as follows: at first, the upper side is scribed using a laser cutting device in the following manner: first, the glass plate is scribed with a diamond that forms a pre-scribed line on the periphery of the circle. Then, the plate is heated with a laser expanded to form a V-shaped focal spot and is cooled by a jet of ethanol and air. After the separation lines are formed, the inside diameter and the outside diameter are broken out according to the punch/ring method until the following applies: for the inside diameter Ø d(punch)=20 mm, d(ring)=50 mm, h(plexiglass)=2 mm; for the outside diameter Ø d(punch)=65 mm, d(ring)=80 mm, h(plexiglass)=2 mm, the punch being supplied through a power-controlled linear axis.

The isolation or separation of the broken or separated parts is performed with hot air of approximately 200° C. for the outer part and with liquid nitrogen for the inner part.

The present method indicates novel scribe and break techniques by means of which glass substrates may be broken out of glass plates without damaging the surface thereof.

LIST OF IDENTIFICATION NUMERALS

1 flat glass
22 cutting tool
24 glass surface
26 separation line
100 hard disk
102 focal spot of the laser
104 cooling spot
106 external contour
107 internal contour
108 scribed line
110 laser scribed line
200 base pad
202 rotatable work table
204 wheel
208 break
300.1
300.2 flexible plates
302 stack
304 aperture of the base pad
306 punch
308.1 internal region
308.2 external region
400 pocket
402 vacuum connection

The invention claimed is:

1. A method of manufacturing glass plates of a circular contour from flat glasses involving the following steps:

scribing separation lines of a depth $T_{glass\ substrate}$ along the circular contour in at least one side of the flat glass using a cutting device, positioning the glass plate on a base pad having an aperture therethrough, wherein the base pad has a predetermined hardness, a defined force F is applied to the flat glass by means of a pressing facility so that a circular scribed line is created along the separation lines and the hardness of the base pad correlates to the force to be applied, the diameter of the aperture always being larger than the diameter of the scribed line, the scribed line being positioned over the aperture, the application of the defined force causing the scribed line to be driven through the entire thickness of the flat glass, the defined force to be applied and the hardness of the base pad being chosen such that, when the scribed line is driven through the entire thickness of the flat glass, the border of the glass plate is largely prevented from breaking off under transverse stresses.

2. The method according to claim 1, wherein the aperture has a shape that conforms to the contour of the separation line.

3. A method of manufacturing glass plates of circular contour from flat glasses involving the following steps:

scribing separation lines of a depth $T_{glass\ substrate}$ along the circular contour in at least one side of the flat glass using a cutting device, positioning the glass plate on a base pad having an aperture therethrough, wherein the base pad has a predetermined hardness, a defined force F is applied to the flat glass by means of a pressing facility so that a circular scribed line is created along the separation lines and the hardness of the base pad correlates to the force to be applied, the diameter of the aperture always being larger than the diameter of the scribed line, the scribed line being positioned over the aperture, the application of the defined force causing the scribed line to be driven through the entire thickness of the flat glass, the defined force to be applied and the hardness of the base pad being chosen such that, when the scribed line is driven through the entire thickness of the flat glass, the border of the glass plate is largely prevented from breaking off under transverse stresses, wherein the force is applied by compressed air and/or vacuum.

* * * * *